United States Patent [19]

Hagrman et al.

[11] 4,218,879

[45] Aug. 26, 1980

[54] OVERSPEED PROTECTION DEVICE

[75] Inventors: Raymond L. Hagrman, O'Fallon; Jack R. Sandridge, St. Charles; Paul D. Soete, Florissant, all of Mo.

[73] Assignee: McDonnell Douglas Corporation, St. Louis, Mo.

[21] Appl. No.: 955,520

[22] Filed: Oct. 30, 1978

[51] Int. Cl.$^2$ .......................... F02C 9/04; G01P 3/56
[52] U.S. Cl. .............................. 60/39.28 R; 361/240; 324/161; 60/223
[58] Field of Search ...................... 361/236, 242, 240; 324/161; 60/223, 39.28 R, 243

[56] References Cited

U.S. PATENT DOCUMENTS

| | | | |
|---|---|---|---|
| 3,500,375 | 3/1970 | Klimo | 324/161 |
| 3,731,301 | 5/1973 | Davis | 324/161 |
| 3,780,346 | 12/1973 | Gagnon | 361/240 |
| 3,803,425 | 4/1974 | Carp | 324/161 |
| 3,885,137 | 5/1975 | Ooya et al. | 361/242 |
| 4,007,492 | 2/1977 | Rose | 361/242 |
| 4,076,999 | 2/1978 | Edwards et al. | 361/242 |
| 4,121,273 | 10/1978 | Jarrett | 361/242 |

Primary Examiner—Robert E. Garrett
Attorney, Agent, or Firm—Lionel L. Lucchesi

[57] ABSTRACT

An overspeed protection system is provided which utilizes simplified construction for detecting overspeed conditions of a rotating device. In the preferred embodiment, a single up/down counter is employed in an overall sequence which includes a first time period during which the counter is counted up from a preselected value by a series of pulse representations of speed for the rotating device. After the expiration of the first time period of the sequence, the counter value is compared to an overspeed limit selected during the previous sequence. If that limit is exceeded, an overspeed condition is detected by the system. In a second time period of the overall sequence, the counter is down counted by the pulse representations of speed. After the expiration of the second predetermined time period of the sequence, the counter value is compared to the original preset value to determine the rate of change in device speed. If the rate of change exceeds some preselected value, a low overspeed limit is used for the overspeed limit of the next up count for the subsequent sequence. If the rate of change does not exceed the preselected value, a high overspeed limit is used for the overspeed limit of the next up count for the subsequent sequence. The system outputs an overspeed signal only if an overspeed is detected on consecutive up count/down count portions of a sequence.

17 Claims, 6 Drawing Figures

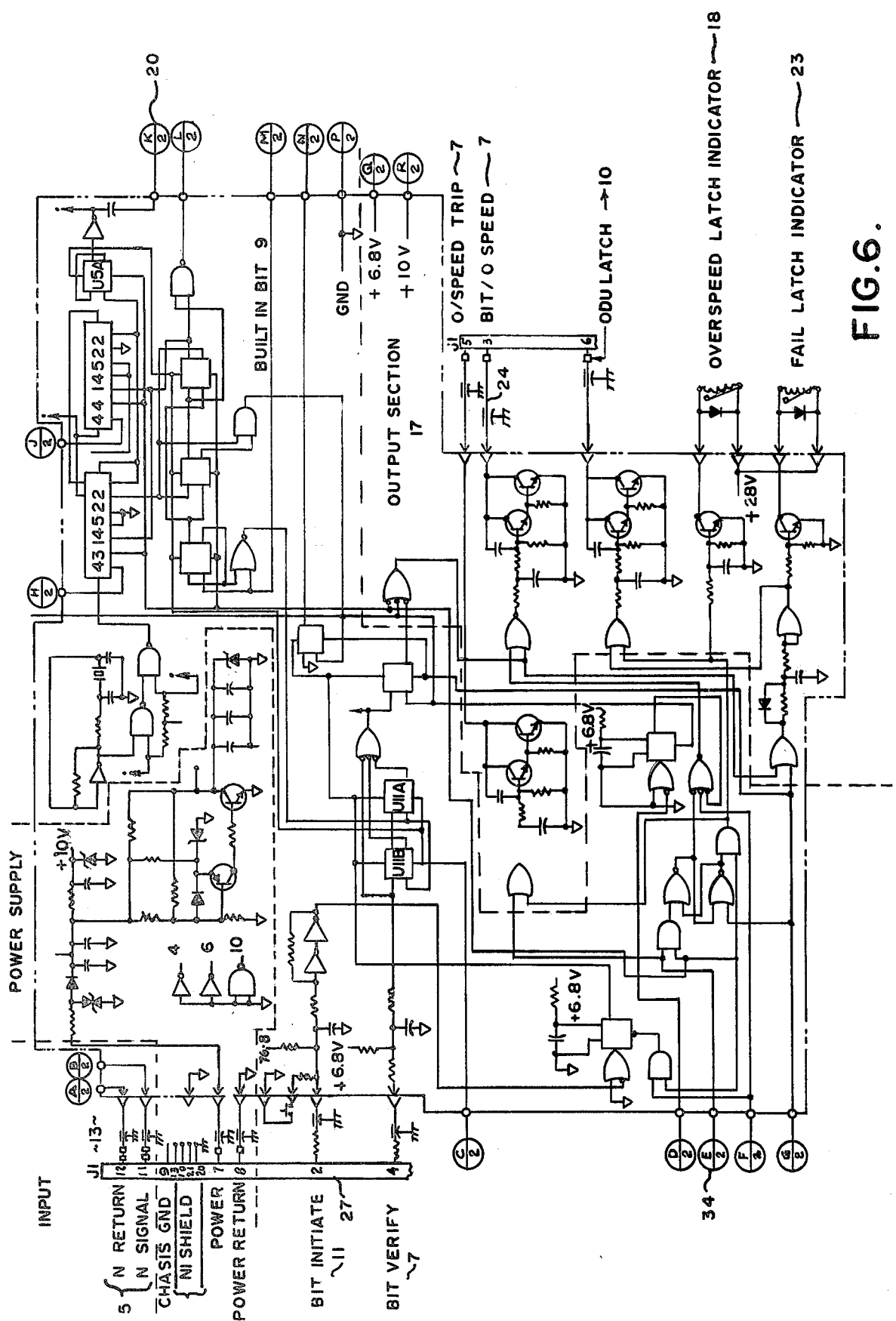

OVERSPEED PROTECTION DEVICE

The government has rights in this invention pursuant to Contract Numbers F33657-76-C-0100 awarded by the Department of the Air Force.

BACKGROUND OF THE INVENTION

This invention relates to a system and method for detecting overspeed conditions of a rotating member. While the invention is described with particular reference to its application in aircraft engines, those skilled in the art will recognize the wider applicability of the inventive principles disclosed hereinafter.

A number of high performance aircraft employ engine electronic control means to supplement pilot input commands to a hydromechanical fuel control system for the engine. The electronic engine control means essentially is a special purpose computer which monitors the pilot throttle input and modifies those commands to obtain optimum engine, and consequently aircraft, performance. While the electronic engine control means works well for its intended purpose, the electronic engine control can malfunction. In particular, electronic engine control means can malfunction in a functional mode which results in full up trim commands being locked into the hydromechanical fuel control system. Thereafter, as the pilot advances the aircraft throttle, overspeed in the engine results, with subsequent engine destruction.

The overspeed detection system of this invention detects the impending overspeed condition, removes the electronic engine control commands, notifies the pilot of the sensed overspeed condition, and prevents the engine from being destroyed. The engine continues to be controlled by the basic hydromechanical fuel control system without assistance from the electronic engine control means.

The system of this invention is designed to be readily adaptable to existing aircraft models, and may be located in remote locations with respect to the engine and electronic engine control system being monitored. Because of its ability to be remotely located, the overspeed detection system of this invention may be installed in an environmentally acceptable portion of the aircraft, which enhances its reliability and decreases the maintenance required for the system.

One of the objects of this invention is to provide an overspeed detection system for a rotating device.

Another object of this invention is to provide an overspeed detection device for the turbine of an aircraft engine.

Another object of this invention is to provide an overspeed detection device which may be located remotely with respect to the rotating device being monitored.

Another object of this invention is to provide an overspeed detection system having built in test capabilities for checking system integrity.

Other objects of this invention will be apparent to those skilled in the art in light of the following description and accompanying drawings.

SUMMARY OF THE INVENTION

In accordance with this invention, generally stated, an overspeed detection system for detecting overspeed conditions of a rotating device is provided which employs a simplified counter scheme to detect the engine overspeed condition. The preferred embodiment of the invention is adapted to detect overspeed conditions of the turbine of the engine for high performance jet aircraft. The detection system monitors engine, i.e. turbine, speed and utilizes an up/down counter to detect an overspeed condition when engine speed reaches a high preset value of revolutions per minute (RPM), or when engine speed reaches a lower but above normal preset value of RPM while the engine speed rate of change exceeds a preset value.

BRIEF DESCRIPTION OF THE DRAWINGS

In the drawings,

FIG. 6 is a detailed diagrammatic view of a second portion of engine overspeed detection system for the second embodiment of this invention.

DESCRIPTION OF THE PREFERRED EMBODIMENT

Figure 1:
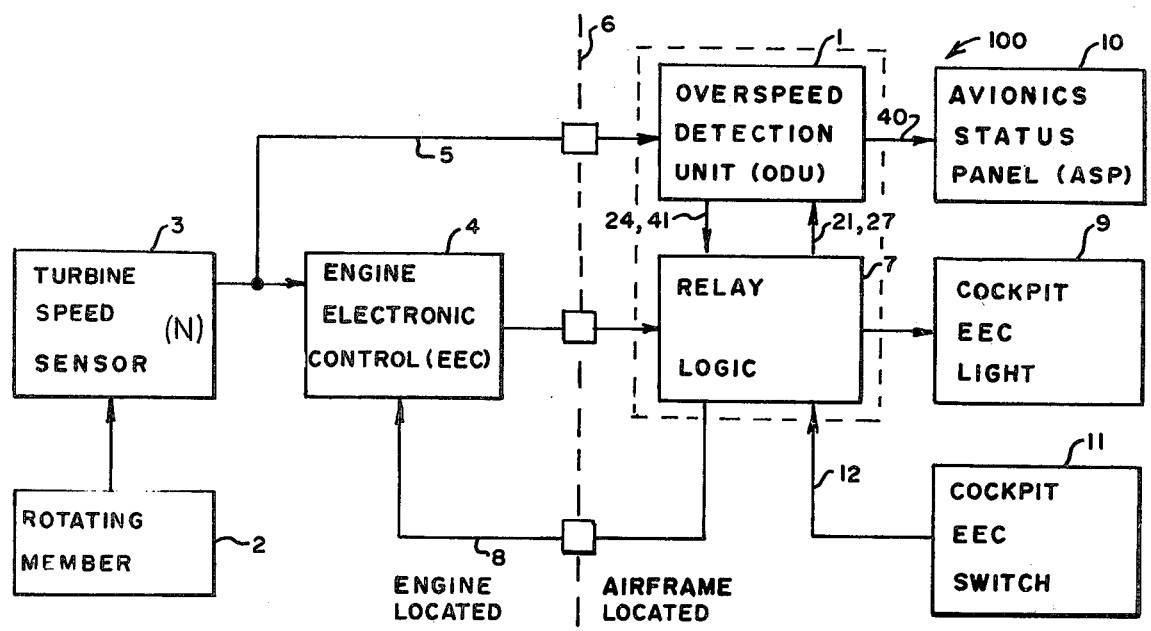
FIG. 1 is a block diagrammatic view of an aircraft system employing the overspeed detection system of this invention.

Referring now to FIG. 1, reference numeral 1 indicates an overspeed detection unit of an overspeed protection system 100 which is employed to detect overspeed conditions of a rotating member 2. In the preferred embodiment, the rotating member 2 is an aircraft engine for a high performance jet aircraft and engine speed is obtained from a suitable sensor 3. Sensor 3 is conventional and may comprise any of a variety of commercially available devices. Output of the sensor 3 is an input to an engine electronic control means 4. As indicated above, the engine electronic control means 4 essentially is a special purpose computer which monitors pilot throttle command input to the engine of the aircraft and maximizes engine performance and safety in response to those throttle commands. It too is conventional and is not described in detail.

The detection unit 1 receives engine speed signals from the sensor 3 along a suitable pick-up 5. As diagrammatically illustrated in FIG. 1, the detection unit 1 is remotely located with respect to the rotating member 2 in the air frame of the aircraft, and that remote location is indicated by a dash divider line 6. The ability to remotely locate the detection unit 1 from the environment of the rotating member or engine being monitored substantially reduces maintenance and operational problems commonly present when electronic devices are located in the same environment as the engine.

Upon detection of an overspeed condition, the detection unit 1 operates through a suitable relay logic means 7 to disable engine electronic control means 4 operation by a suitable output control signal along an output 8. The detection unit 1 and relay logic means 7 also produce an indication of the detected overspeed condition to the pilot at a cockpit indicator light 9 and to maintenance personnel at an avionics status panel 10. Other display and disabling signals may be employed, if desired.

As shown in FIG. 1, a cockpit engine electronic control switch 11 is operatively connected to the relay logic means 7 along a conductor 12. The operation and use of the switch 11 in conjunction with the overspeed detection unit 1 is described in greater detail hereinafter.

The engine electronic control means 4 controls the aircraft engine via throttle and nozzle trim commands to a hydromechanical fuel control system, not shown. The hydromechanical fuel control system is the basic control for the aircraft, but the pilot input commands to that system are modified by the engine electronic control commands to optimize engine and aircraft performance. As indicated, certain failure mode operations of the engine electronic control result in full uptrim commands being locked into the hydromechanical fuel control system which can cause overspeed turbine failures as the pilot advances the aircraft throttle. The purpose of the overspeed protection system is to detect the failure mode condition of the engine electronic control command by monitoring engine speed, prevent engine destruction by removing the electronic control command from the hydromechanical fuel control system of the aircraft upon detection of an overspeed condition, notify the pilot when the electronic engine control command is removed from the hydromechanical fuel control, and prevent further operation of the engine electronic control. Engine operation continues under control of the hydromechanical fuel control, although reduced performance commonly results upon disabling of the engine electronic control means 4.

Figure 2:
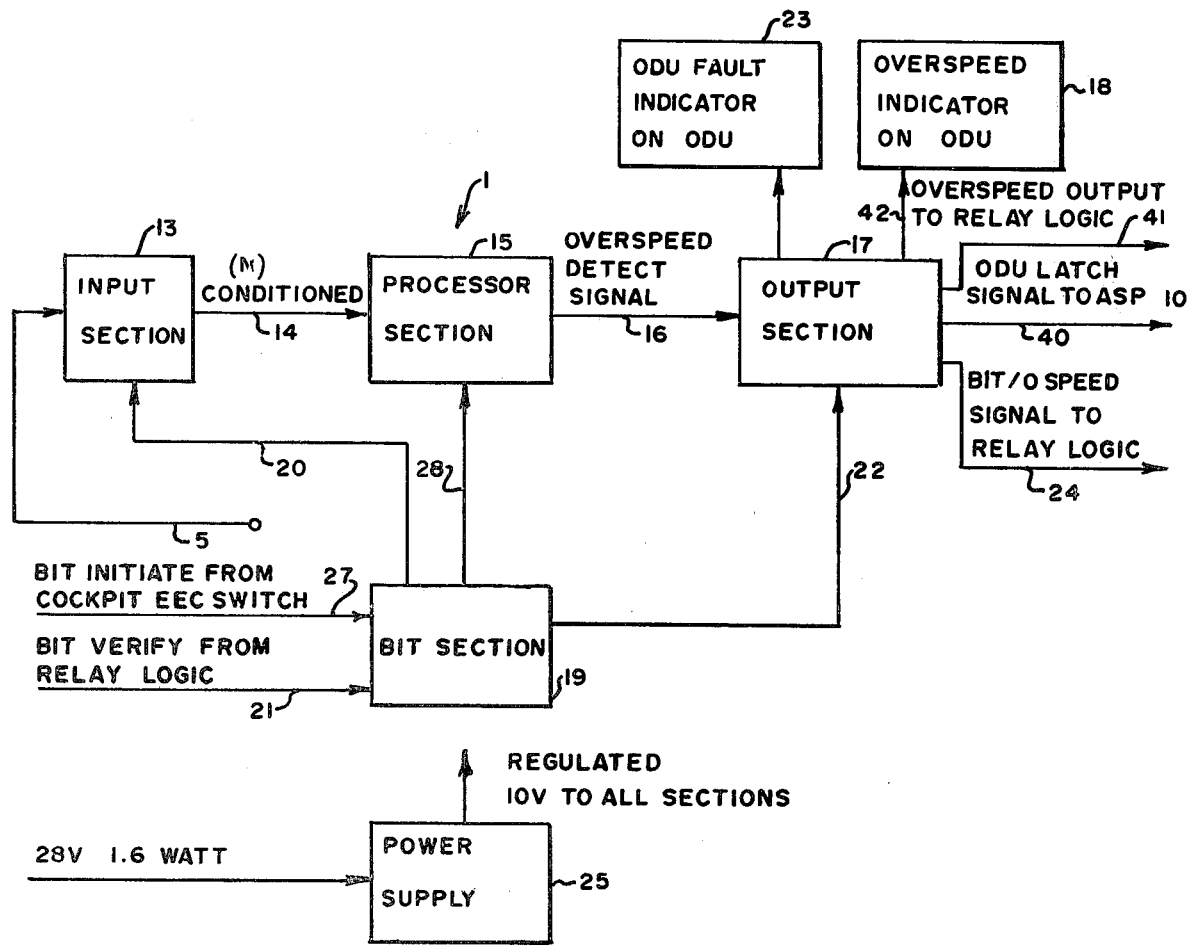
FIG. 2 is a more detailed block diagrammatic view of the overspeed detection unit shown in FIG. 1.

The overspeed detection unit 1 is shown in greater detail in FIG. 2. As there illustrated, the speed signal input from the pick-up 5 enters input section 13 where the signal is filtered and doubled so that a conditioned signal representation of engine speed at an output 14 of the input section 13 forms an input to a processor section 15.

The processor section 15 is responsible for detecting the overspeed condition. When an overspeed condition is detected, a suitable signal 16 is sent to an output section 17. Output section 17 in turn generates the necessary control signals to the relay logic means 7 and the avionic status panel 10. In addition, output section 17 provides an overspeed indication at the detection unit 1 itself through an indicator means 18.

The detection unit 1 includes a built-in test (bit) section 19 which is enabled to provide a false speed signal input 20 to the input section 13. The false speed signal is processed through the input section 13 and processor section 15 in order to test the operation of those sections and of the relay logic means 7. A suitable test limit signal 28 is provided to the processor section 15 from the bit section 19. The operation of the system 100 is monitored by bit section 19, utilizing a bit verify signal 21 from the relay logic means 7. If the overspeed detection unit 1 is operating improperly, the bit section 19 indicates malfunction to the output section 17 via an output 22. Output section 17 then functions to display improper operation of the system 100 at an indicator means 23. In addition, the output section 17 signals the avionics status panel 10 via an output 40 and provides a bit annunicate signal to the relay logic means 7 at an output 24.

The overspeed detection unit 1 includes a suitable power supply means 25 for providing required voltages to the various sections of the overspeed detection unit 1.

Figure 3:
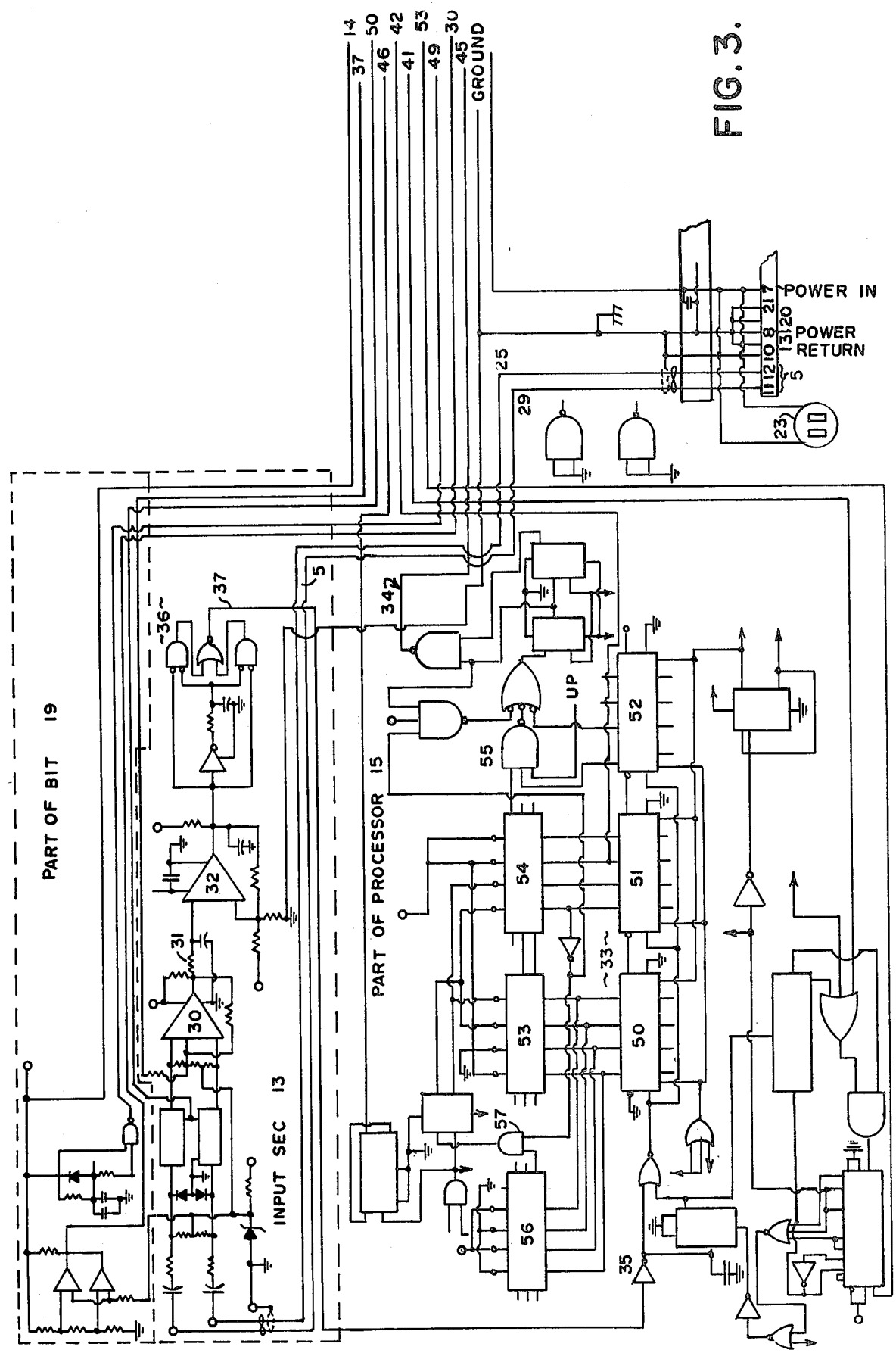
FIG. 3 is a detailed diagrammatic view of a first portion of overspeed detection system for a first embodiment of this invention.
Figure 4:
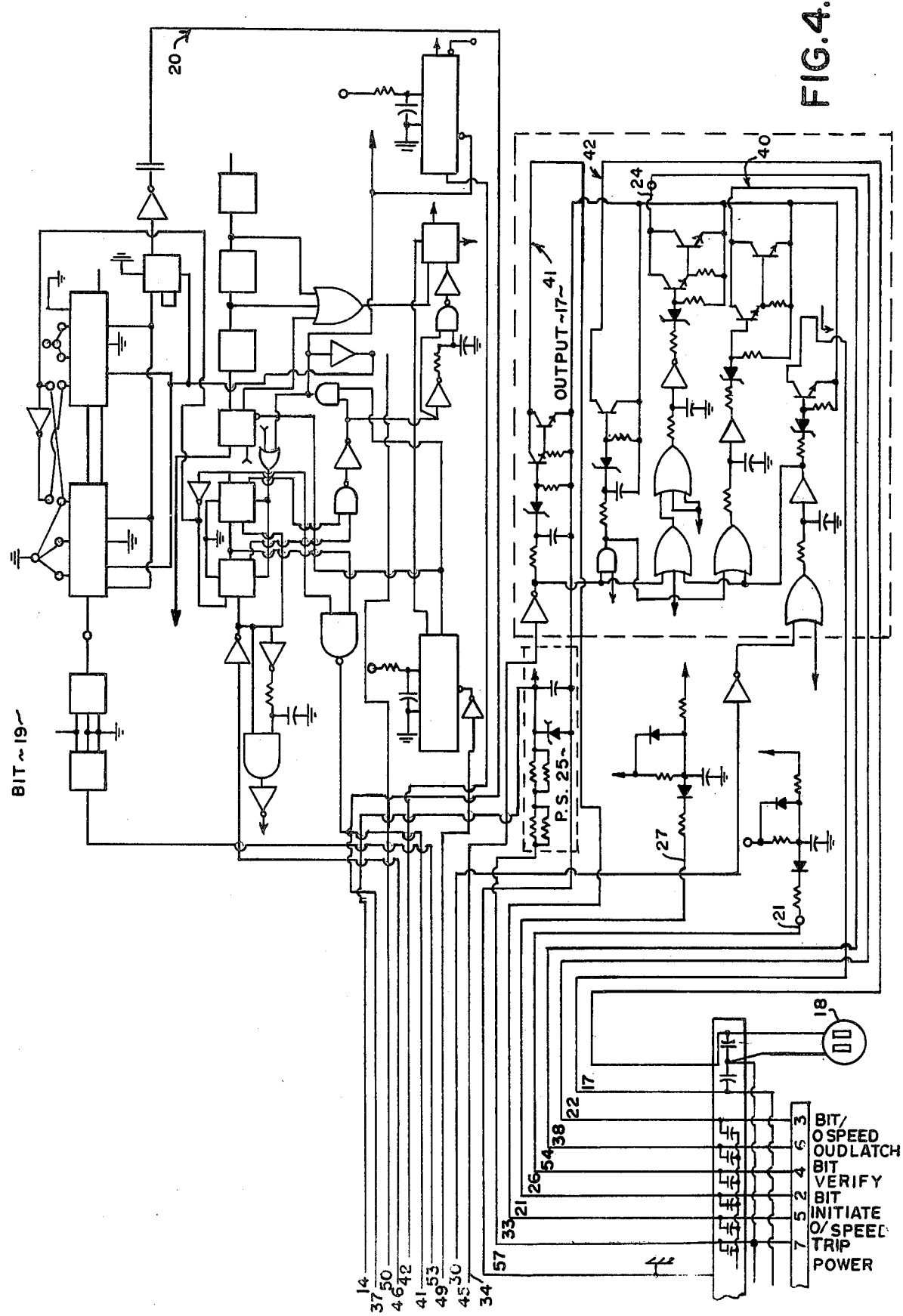
FIG. 4 is a detailed diagrammatic view of a second portion of engine overspeed detection system for the first embodiment of this invention.

The system as thus shown and described will enable practitioners skilled in the art to practice our invention. FIGS. 3 and 4 are provided to give additional information for practicing the invention, but specific components and common operational components of the circuits are not described in detail.

As shown in FIGS. 3 and 4, the pick-up 5 differential input to the input section 13 is routed through a differential amplifier 30, a suitable filter 31 and a comparator with hysteresis 32. The output of the comparator with hysteresis 32 proceeds through a doubler 36, an output 37 of which is an input to a buffer 35 of the processor 15.

The processor 15 uses a single counter means 33 having stages 50, 51 and 52 to detect an overspeed condition. The up/down sequence of the counter means 33 operates under a predetermined time sequence. During a first time period of the sequence, the speed pulses from the buffer 35 cause the counter means 33 to up count from a preset value. At the mid point of the time sequence, counter means 33 contains the sensed speed value. The speed value contained in the counter means 33 count is compared to an overspeed limit in comparators 53, 54 and 55. For low accelerations, the overspeed limit is chosen as 115 percent of a predetermined speed value, while the limit is chosen as 110 percent of the same predetermined speed value for high accelerations, high accelerations being defined for the purpose of this specification as 30 percent per second or greater of the same predetermined speed value. The appropriate limit is selected during the previous sequence. If the limit is exceeded, an overspeed indication is detected. During the second half of the sequence, the speed pulses cause the counter means 33 to down count from the value contained at the mid point of the time sequence. At the end of this second time period, the value in the counter means 33 is compared to the original preset value in a comparator 56 and a comparator 57 to determine the rate of change in engine speed. Only the five least significant bits need be utilized for this comparison as this rate range exceeds any physical engine capability. If the rate exceeds a preselected limit, the low overspeed limit is used as the overspeed limit for the next up count. If the rate does not exceed the preselected limit, the high overspeed limit is used for the overspeed limit of the next up count. Where a first overspeed indication is detected during an up count, a count less than the preset value prior to the up count is required for a second overspeed indication to be detected. The processor 15 outputs an overspeed condition signal only if an overspeed indication is detected on consecutive up count/down count portions of the time sequence. That output 34 is transmitted to output section 17 shown in FIG. 4. This overspeed condition signal is employed in the output section 17 of the overspeed detection unit 1 to provide the latch signal 40 to the avionics status panel 10, an overspeed output 41 to relay logic 7, and an overspeed indicator signal 42 to the indicator means 18.

The built-in test section 19 substitutes the built-in test signal for the sensed speed signal upon actuation of a bit initiate signal 27. As indicated above, the system 100 of this invention is intended for installation in aircraft employing engine electronic control means 4, however, it can be utilized in other engine control applications. The check out procedure for such aircraft calls for activation of the engine electronic control switch (not shown)

prior to takeoff. We employ that switch closure to initiate the bit test operation of the system 100.

The bit initiate signal 27 results in a test signal appearing at the input 20 (FIG. 4) and the bit test signal is substituted for the normal speed signal to input section 13. The test signal is processed through the input section 13 in a conventional manner and forms the input to the processor 15. The built-in test section 19 is used to start a three part false speed input sequence. The first false speed input is set above the static trip point of 115 percent of the predetermined speed value. The second false speed input is above the dynamic trip point of 110 percent of the predetermined speed value and below the static trip point of 115 percent of the predetermined speed value, but the down count time in the processor 15 is extended slightly so that the high RPM rate, i.e., 30 percent per second, is detected. The third false speed input is the same as the second false speed input except the down count time in the processor 15 is not extended. During the three part sequence, removal relays of the relay logic means 7 are monitored via bit verify 21 to see that they are energized during the first two false speed inputs, then deenergized for the third. If these conditions are not met, the overspeed detector unit fault indicator 23, the avionic status panel latch output 40, and the bit/o speed signal at the output 24 are present so that the system 100 indicates a system malfunction to the pilot of the aircraft.

As described above, during normal pre-flight procedures, the engine electronic control switch is cycled prior to flight take-off. The built-in test is activated during this switch cycle, and will indicate a malfunction if present in the overspeed detector unit to the pilot at that time.

In addition to the previously described bit operation, the power supply 25 voltage and the input speed signal 5 are continuously monitored to determine that they are in range. An out-of-range condition on either results in a bit/o speed signal at output 24.

As thus described, an overspeed detection unit is provided meeting all the ends and objects herein described.

Figure 5:
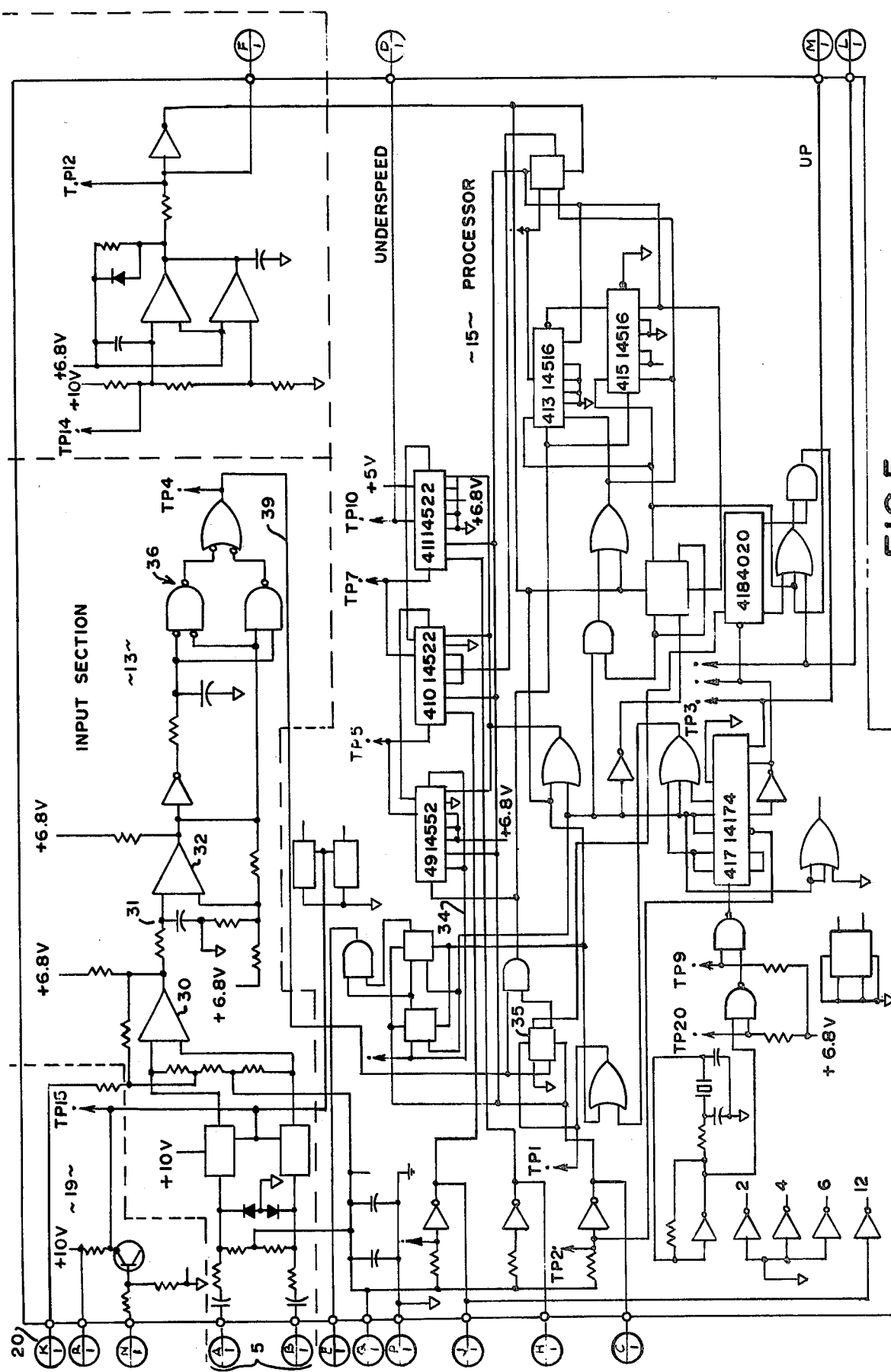
FIG. 5 is a detailed diagrammatic view of a first portion of overspeed detection system for a second embodiment of this invention.

Numerous variations, within the scope of the appended claims, will be apparent to those skilled in the art in light of the foregoing description and accompanying drawings. While the overspeed detection unit was described with its primary application in high performance aircraft, those skilled in the art will recognize that the invention may be applied in a variety of applications. The concept of up counting a counter and comparing the up count obtained with a predetermined static limit, then down counting the counter and comparing that counter count with initial setting to establish a rate of change and comparing that indicated rate of change with a dynamic limit provides an exceedingly simple and accurate method and apparatus for determination of overspeed conditions in a variety of applications. Those skilled in the art will recognize that the overspeed condition signal can be developed in other ways. Thus, the rate and speed determination can be obtained with plural up/down counters. For example, the rate and speed determination can be performed in separate counters. Such a system is shown in FIGS. 5 and 6, where like numerals have been employed, where appropriate. Rate is still monitored in an up/down counter while speed is monitored by a second counter set to a predetermined value based on the count of the up/down counter. The second counter is down counted by the speed signal. If the second counter reaches zero, an overspeed indication is made. The use of plural counters eliminated the need for the comparators employed in the systems shown and described. These variations are merely illustrative.

Having thus described the invention, what is claimed and desired to be secured by Letters Patent is:

1. A device for detecting an overspeed condition in an engine having at least one rotating part, comprising:
   means for sensing the rotational speed of the rotating part and developing an electrical signal based thereon;
   means for processing the speed signal including means for determining an overspeed indication when the part speed reaches a preselected high RPM value; and
   means for detecting an overspeed indication when the part speed reaches a lower but above normal RPM value and the rate of change of the RPM value exceeds a predetermined limit.

2. The device of claim 1 wherein said determining means comprises counter means caused to up count from a preset value for a predetermined period, and means for comparing the count of said counter with a preselected value.

3. The device of claim 2 wherein said detecting means comprises said counter means, wherein said counter means is caused to down count from the value obtained after said first period for a second period, and means for comparing the down count of said counter with said preset value.

4. The device of claim 3 further including means for checking operation of said device, said last-mentioned means including signal means for substituting a false speed signal to said processing means.

5. The device of claim 4 adapted for use in an aircraft, said aircraft including an engine employing engine electronic control means, further including output means for generating a signal to disable said engine electronic control upon the occurrence of an engine overspeed condition.

6. The device of claim 5 further including means for signalling an overspeed condition occurrence to a pilot of said aircraft.

7. The device of claim 6 further including means for visually indicating an overspeed condition occurrence at said device.

8. The device of claim 6 further including means for visually indicating a fault in said overspeed detector to said pilot.

9. A method of detecting an overspeed occurrence on a rotating structure, comprising the steps of;
   obtaining a signal representation of the speed of said device;
   processing said signal representation to obtain an overspeed indication based on engine speed and on rate of change of engine speed; and
   developing an overspeed condition signal output upon the successive occurrence of said overspeed indication.

10. The method of claim 9 wherein said process steps include the additional steps of:
    causing a counter means to up count from a preset value for a first time period; and
    comparing the count of said counter at the termination of said period with a preselected value.

11. The method of claim 10 further including the steps of:

causing said counter means to down count from the value obtained after said first time period to the termination of a second time period; and comparing the count of said counter with said preset value.

12. The method of claim 10 wherein said first and said second time periods are equal.

13. In an avionics system for an aircraft employing an electronically activated control means for controlling an engine, the improvement comprising means for detecting a malfunction of the control means based on the speed of the engine controlled thereby, including means for developing a signal representation of engine speed, means for processing said engine speed representation so as to detect an overspeed indication based on engine speed and on rate of change in engine speed over a predetermined period, and means for disabling the control means upon the occurrence of two successive overspeed indications.

14. The improvement of claim 13 wherein said processing means comprises counter means caused to up count from a preset value for a predetermined period, and means for comparing the count of said counter with a preselected value.

15. The improvement of claim 14 further including means for checking operation of said device, said last-mentioned means including signal means for substituting a false speed signal to said processing means.

16. The improvement of claim 15 adapted for use in an aircraft, said aircraft including an engine employing engine electronic control means, further including output means for generating a signal to disable said engine electronic control upon the occurrence of an engine overspeed condition.

17. A system for detecting an overspeed condition in a device having at least one rotating part, comprises:

means for sensing the rotational speed of the rotating part and developing an electrical signal based thereon;

means for processing the speed signal including means for determining an overspeed indication when the part speed reaches a preselected high RPM value, and means for detecting an overspeed indication when the part speed reaches a lower but above normal RPM value and the rate of change of the RPM value exceeds a predetermined limit; and means for generating an overspeed condition signal upon the successive occurrence of said overspeed indications.

* * * * *